United States Patent

Obayashi et al.

[11] Patent Number: 5,943,614
[45] Date of Patent: Aug. 24, 1999

[54] MOBILE RADIO COMMUNICATION DEVICE USING PLURALS AUTHENTICATION PARAMETERS

[75] Inventors: Arata Obayashi; Takashi Sakagawa, both of Hino, Japan

[73] Assignee: Kabushiki Kaisha Toshiba, Japan

[21] Appl. No.: 08/592,300

[22] PCT Filed: Aug. 11, 1994

[86] PCT No.: PCT/JP94/01331

§ 371 Date: Feb. 9, 1996

§ 102(e) Date: Feb. 9, 1996

[87] PCT Pub. No.: WO95/05054

PCT Pub. Date: Feb. 16, 1995

[30] Foreign Application Priority Data

Aug. 11, 1993 [JP] Japan .................................. 5-199507

[51] Int. Cl.$^6$ ...................................................... H04B 1/38
[52] U.S. Cl. ........................ 455/411; 455/551; 455/575
[58] Field of Search ................................. 455/410, 411, 455/551, 462, 465, 524, 575, 552

[56] References Cited

U.S. PATENT DOCUMENTS 5,241,598  8/1993  Raith ........................................ 455/411
5,557,676  9/1996  Naslund et al. ......................... 455/411
5,615,267  3/1997  Lin et al. ................................. 455/411
5,625,869  4/1997  Nagamatsu et al. .................... 455/411

FOREIGN PATENT DOCUMENTS 61-29294   2/1986   Japan .

*Primary Examiner*—Edward F. Urban
*Attorney, Agent, or Firm*—Banner & Witcoff, Ltd.

[57] ABSTRACT

There is provided a mobile radio communication device which is designed to prevent dishonest applications by using a management table (30) for storing a plurality of MINs and count values as authentication parameters corresponding to the MINs and effecting the authentication procedure at the time of radio connection to a base station. Whether or not an input MIN is already set in the management table (30) is determined at the time of MIN setting operation, and if it is already set, it is determined that the setting operation is a resetting operation and the already set MIN and count value are kept held as they are. On the other hand, if the input MIN is not set in the management table (30), whether or not a MIN having a count value of "0" is set in the management table (30) is determined, and if it is set, an input MIN is set in place of the above MIN, and if it is not set, an input MIN and the initial value "0" of the count value are set in an available area of the management table (30).

21 Claims, 5 Drawing Sheets

| NO. | M I N | COUNT VALUE |
|---|---|---|
| 1 | 1 2 3 - 4 5 6 - 7 8 9 0 | 9 |
| 2 | 5 4 3 - 2 1 0 - 8 7 6 5 | 13 |
| 3 | 5 4 3 - 2 1 9 - 4 3 2 1 | 0 |
| 4 | * | * |
| | | |
| K | * | * |

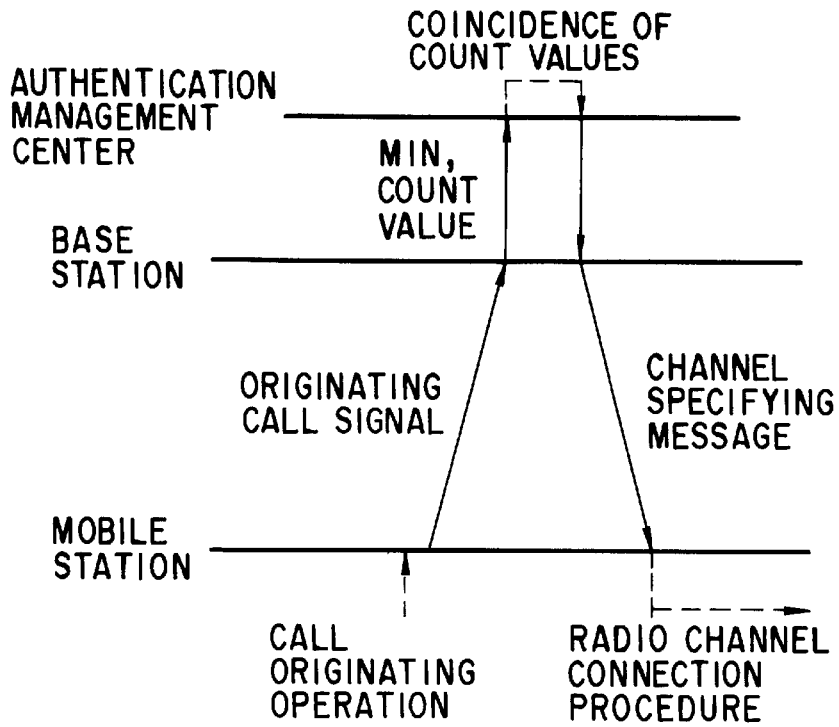
F I G. 2
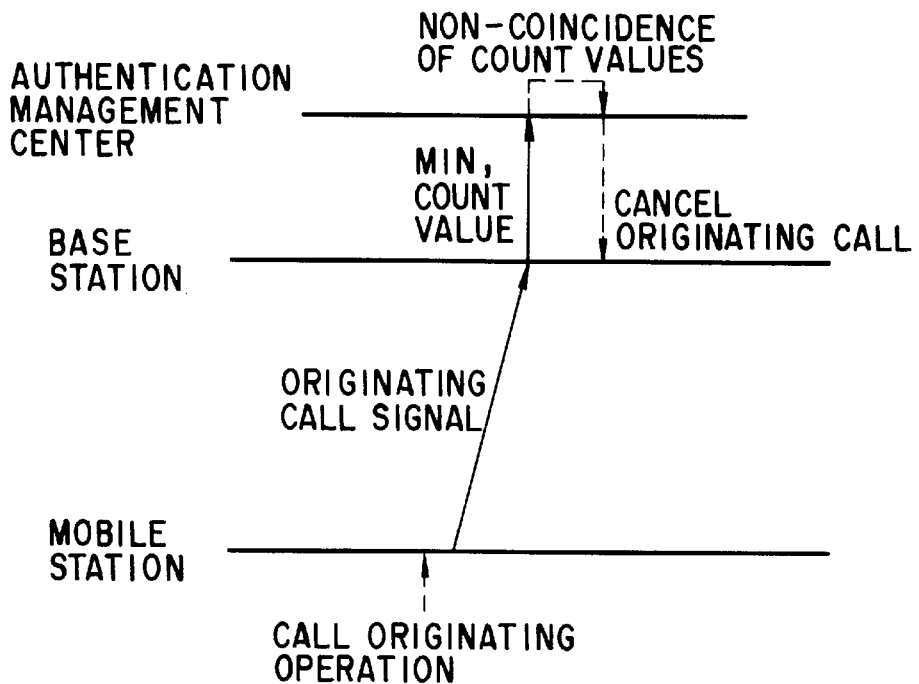
F I G. 3

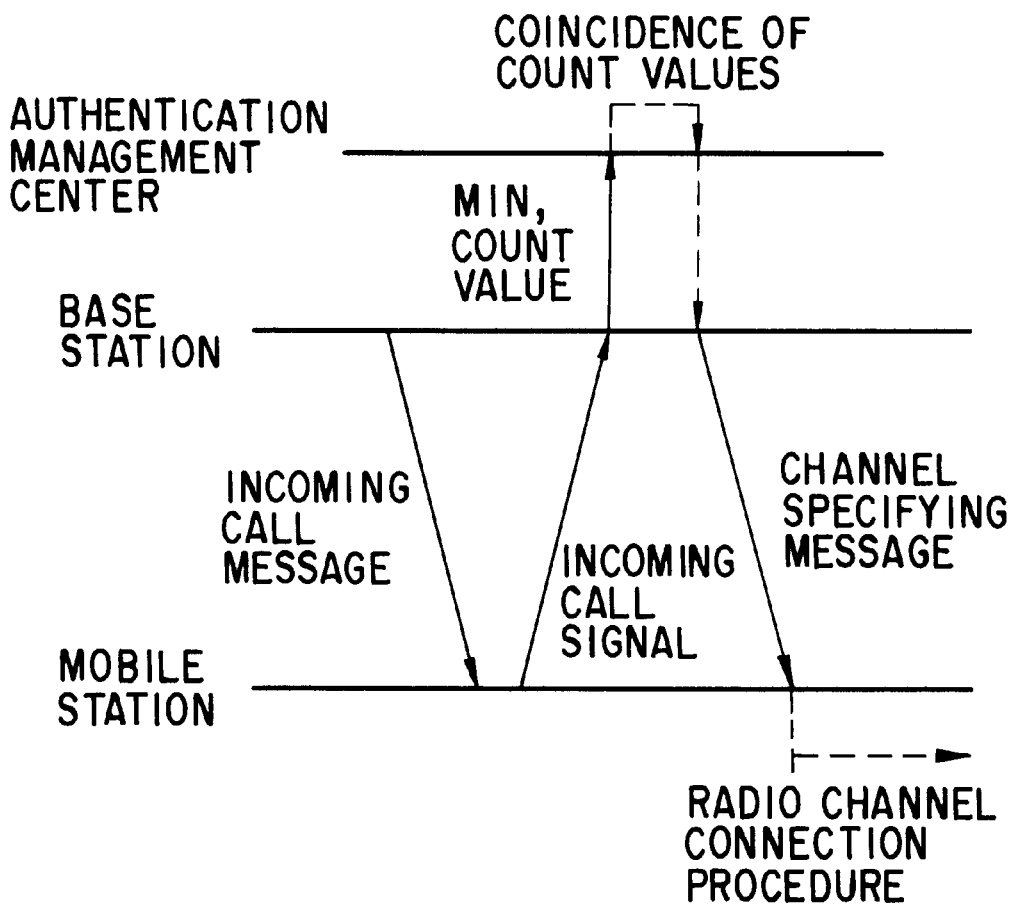
F I G. 4

MOBILE RADIO COMMUNICATION DEVICE USING PLURALS AUTHENTICATION PARAMETERS

TECHNICAL FIELD

The present invention relates to a mobile radio communication device such as a car telephone device, portable telephone and cordless telephone, and more particularly to a mobile radio communication device used in a mobile radio communication system having a authentication procedure in the procedure for connecting a base station and a mobile station to each other via a radio channel.

BACKGROUND ART

Recently, various types of mobile radio communication systems have been developed and put into practical use with the development of the radio communication technique and an increase in the communication need, and a cellular radio communication system is provided as one example. FIG. 1 shows the schematic construction of the system. For example, the system includes a control station CS connected to a wire communication network NW via a circuit line $CL_0$, a plurality of base stations $BS_1$, $BS_2$, $BS_3$, ... connected to the control station CS via respective circuit lines $CL_1$ to $CL_n$, and a plurality of mobile stations or units $MU_1$, $MU_2$, $MU_3$, $MU_4$, .... The base stations $BS_1$, $BS_2$, $BS_3$ ... respectively provide radio zones $E_1$, $E_2$, $E_3$ ... which are called cells for respective small different areas in the service area. Each of the mobile stations $MU_1$, $MU_2$, $MU_3$, $MU_4$, ... is connected to the base station of the cell in which the mobile station lies via a corresponding radio channel and each of the mobile stations is connected to the wire communication network NW from the corresponding base station via the control station CS.

Recently, in the above system, an authentication procedure for the mobile station has been provided in the procedure for radio connection between the mobile station and the base station at the time of call originating, call incoming or registration of position. FIGS. 2 and 3 show an example of a sequence of originating call control procedures containing the authentication procedure.

Assume now that the user has effected the originating call operation in the mobile station as shown in FIG. 2. The mobile station generates an originating call signal containing a telephone number MIN (Mobile Identification Number) as a preset identification number of the mobile station and an authentication parameter corresponding to the MIN and transmits the originating call signal to the base station. For example, a count value indicating the number of communications using the MIN is used as the authentication parameter. The count value is counted up in the mobile station and base station each time the communication using the MIN is effected. Therefore, the count value of the mobile station and the count value of the base station for the same MIN are always equal to each other.

When the base station receives an originating call signal from the mobile station, it extracts the count value and MIN contained in the originating call signal and transfers a count value corresponding to the MIN held in the base station together with the extracted MIN and count value to the authentication management center. For example, the authentication management center is located in a control station of higher rank than the control station CS or a control station provided for a plurality of carriers.

The authentication management center first determines whether the received MIN is registered or not, and if the MIN is registered, it collates the count value with a count value for the same MIN counted in the base station. Then, if the collated count values are coincident with each other, it transmits a notice of authentication to the base station. When the base station receives the notice of authentication, it generates a channel specifying message and transmits the same to the mobile station and then seizes and registers a radio channel. When the mobile station receives the channel specifying message, it seizes a radio channel according to the channel specifying message. Thus, the radio link is created by the radio channel between the mobile station and the base station (connection of the radio channel).

On the other hand, if it is determined as the result of collation of the count value of the MIN in the authentication management center that the received count value does not coincide with the count value counted in the base station, the notice of authentication is not returned to the base station from the authentication management center. Therefore, if the notice of authentication is not returned after a preset time has passed after the base station has transmitted the MIN and count value to the authentication management center, the base station cancels the originating call as shown in FIG. 3 and does not issue a channel specifying message. Therefore, no radio link is created between the mobile station and the base station.

FIG. 4 shows a sequence in a case where an incoming call message from the base station is received. When the incoming call message is received from the base station, the mobile station transmits an incoming call signal containing its own MIN and a count value corresponding to the MIN to the base station. When the base station receives the incoming call signal, it extracts the MIN and count value contained in the incoming call signal and transfers them to the authentication management center. The authentication management center confirms that the received MIN is registered and then collates the count value in the same manner as in the case of originating call operation described before. Then, if the count values are coincident with each other, it transmits a notice of authentication to the base station. When the base station receives the notice of authentication, it generates and transmits a channel specifying message to the mobile station.

Thus, by providing the authentication procedure in the radio connection procedure, it becomes possible to prevent a dishonest act that a dishonest man makes a fraudulent use of another's MIN in his mobile station device to make communication with the charges put not on him but on the other person.

However, the conventional mobile station device having the radio connection function containing the authentication procedure has the following problem to be solved. That is, in the mobile station device, a RAM area called a NAM (Number Assignment Module) for storing MINs is provided to make a contract with a plurality of mobile communication corporations (carriers) and MINs can be freely set and reset by the user. When the mobile station is used, a MIN corresponding to the carrier is set by the user's operation to make ready for communication. However, a count value used as the authentication parameter is stored in a RAM different from the NAM and only a single count value is stored in the RAM. When the MIN is changed, the count value is reset.

Therefore, the count value cannot be adequately used when the MIN is changed. If the count value is changed at the time of change of MIN, the original state cannot be restored when the MIN is set to the original value again.

SUMMARY OF THE INVENTION

Therefore, an object of the present invention is to provide a mobile radio communication device capable of continuously effecting the radio connecting operation with respect to the base station by use of original identification information while preventing that the authentication parameter is changed at the time of change of the identification information to make execution of the authentication procedure impossible in a case where the identification information is temporarily changed to different identification information and then restored to the original identification information.

In a mobile radio communication device connected to a base station by effecting the authentication procedure by use of identification information and an authentication parameter corresponding to the identification information, a mobile communication device of the present invention is characterized by comprising storage means capable of storing a plurality of identification information items and authentication parameters corresponding to the identification information items, means for inputting identification information, means for determining whether the identification information input by the input means is already stored in the storage means, and control means for holding the already stored identification information and corresponding authentication parameter as they are when the determining means determines that the identification information is already stored and storing the input identification information together with the initial value of the authentication parameter into the storage means when the determining means determines that the identification information is not stored.

Another mobile radio communication system according to the present invention comprises a base station and a mobile radio station. The mobile radio station comprises storage means capable of storing a plurality of identification information items and authentication parameters corresponding to the identification information items, means for inputting identification information, means for determining whether the identification information input by the input means is already stored in the storage means, control means for holding the already stored identification information and corresponding authentication parameter as they are when the determining means determines that the identification information is already stored and storing the input identification information together with the initial value of the authentication parameter into the storage means when the determining means determines that the identification information is not stored, and means for sending an originating call signal containing identification information and authentication parameter to the base station before transmission and sending an incoming call signal containing identification information and authentication parameter to the base station before reception. The base station comprises means for storing identification information and authentication parameter of each of the mobile radio stations, and means for simultaneously updating corresponding authentication parameters of the mobile radio station and the base station. The mobile radio communication system comprises authentication management means which includes means for detecting the identification information and authentication parameter contained in the originating call signal and incoming call signal sent from the mobile radio station, determining whether the detected authentication parameter coincides with an authentication parameter corresponding to the identification information of the mobile radio station stored in the base station, and permitting creation of a radio link between the base station and the mobile radio station only in the case of coincidence.

BRIEF DESCRIPTION OF THE DRAWINGS

FIG. 2 is a diagram showing a case wherein authentication parameters coincide with each other in a sequence of originating call control procedures containing the authentication procedure;

FIG. 3 is a diagram showing a case wherein authentication parameters do not coincide with each other in a sequence of originating call control procedures containing the authentication procedure;

FIG. 4 is a diagram showing a case wherein authentication parameters coincide with each other in a sequence of incoming call control procedures containing the authentication procedure;

BEST MODE OF CARRYING OUT THE INVENTION

There will now be described the present invention in detail with reference to the accompanying drawings.

Figure 5:
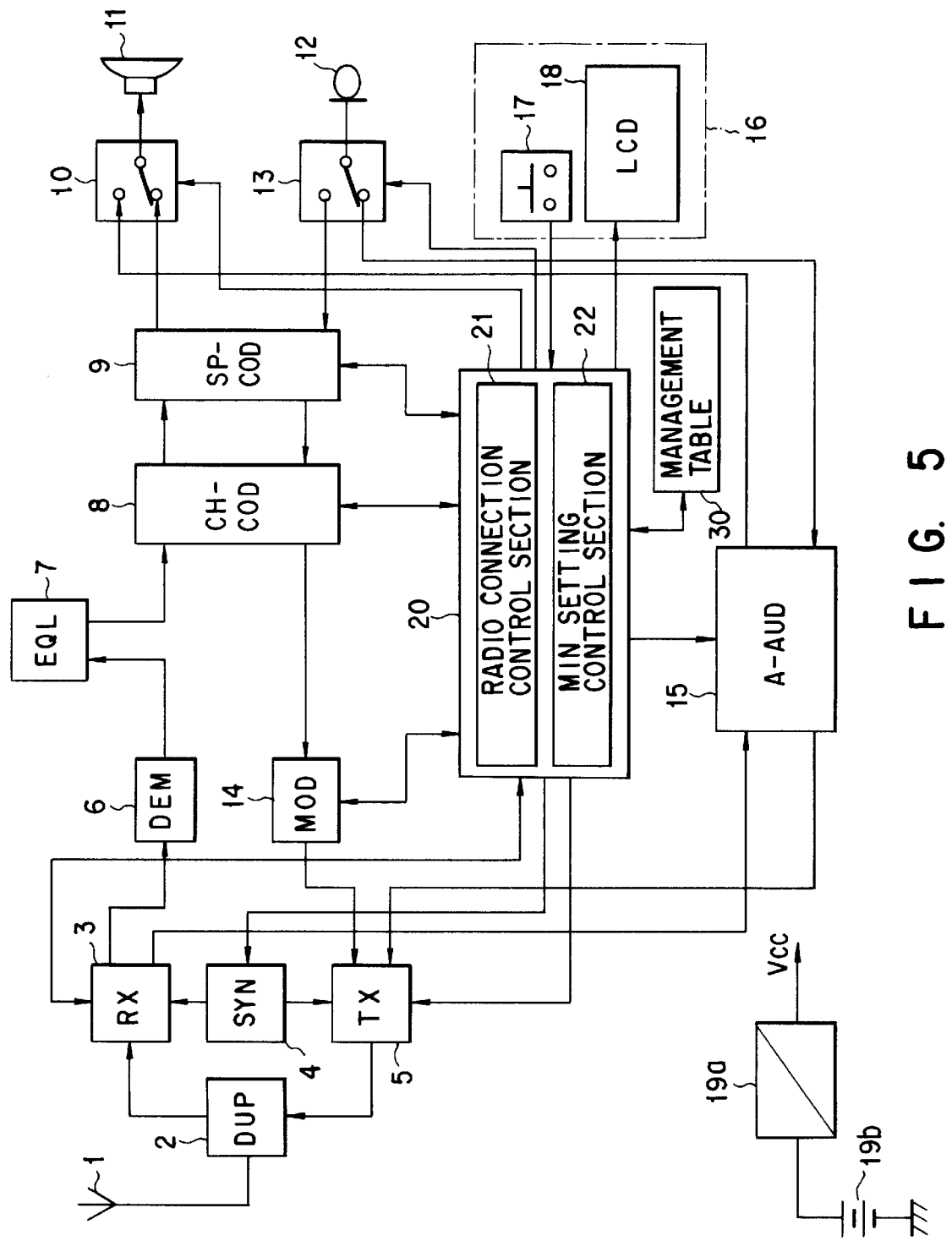
FIG. 5 is a block diagram of a first embodiment of a mobile radio communication system according to the present invention.

FIG. 5 is a circuit block diagram showing the construction of a mobile radio communication device used as a mobile station in a dual mode cellular radio communication system according to a first embodiment of the present invention. In this case, the dual mode indicates a mode in which an analog mode using an analog communication system and a digital mode using a digital communication system are used in combination.

First, a portion relating to the digital mode is constructed as follows. That is, a radio frequency signal sent from base stations $BS_1$ to $BS_n$ via a digital speech channel is received by an antenna 1 and then input to a receiver circuit (RX) 3 via an antenna duplexer (DUP) 2. In the receiver circuit 3, the radio frequency signal is mixed with a reception local oscillation signal output from a frequency synthesizer (SYN) 4 and converted into an intermediate frequency signal. In this case, the frequency of the reception local oscillation signal output from the frequency synthesizer 4 is specified according to channel specifying data SYC output from a control circuit 20. The received intermediate frequency signal is converted into a digital signal by an A/D converter which is not shown in the drawing and then input to a digital demodulator circuit (DEM) 6. In the digital demodulator circuit 6, the received intermediate frequency signal is subjected to the digital demodulation and converted into a digital base band signal. A digital speech signal and digital control signal are included in the digital base band signal output from the digital demodulator circuit 6. Among them, the digital control signal is supplied to the control circuit 20 and identified.

On the other hand, the digital speech signal is subjected to the signal equalization of demodulation waveform in an equalizer (EQL) 7 and then input to an error correction coding/decoding circuit (CH-COD) 8. In the error correction coding/decoding circuit 8, the digital speech signal supplied from the equalizer 7 is subjected to the error correction decoding process and the digital speech signal subjected to the error correction decoding process is input to a speech coding/decoding circuit (SP-COD) 9. In the speech coding/decoding circuit 9, the digital speech signal is subjected to the speech decoding process. The speech signal supplied from the coding/decoding circuit 9 is converted into an analog speech signal by a D/A converter which is not shown in the drawing and then input to an analog switch 10. The switching position of the analog switch 10 is controlled by a control signal output from the control circuit 20 such that an analog speech signal output from the speech coding/decoding circuit 9 may be selected and output in a state in which the digital mode is set. Therefore, the speech signal output from the speech coding/decoding circuit 9 is supplied to a speaker 11 via the analog switch 10 and a corresponding amplified sound is output from the speaker 11.

On the other hand, a transmission signal input from a microphone 12 is input to an analog switch 13. The switching position of the analog switch 13 is controlled by a control signal output from the control circuit 20 such that a transmission signal may be input to the speech coding/decoding circuit 9 in a state in which the digital mode is set. Therefore, the transmission signal is supplied to an A/D converter which is not shown in the drawing via the analog switch 13 and converted into a digital transmission signal and then input to the speech coding/decoding circuit 9. In the speech coding/decoding circuit 9, the digital transmission signal is subjected to the speech coding process. The digital transmission signal output from the speech coding/decoding circuit 9 is input to the error correction coding/decoding circuit 8. In the error correction coding/decoding circuit 8, the digital transmission signal is subjected to the error correction coding process. The coded digital transmission signal is input to a digital modulation circuit (MOD) 14 after a digital control signal generated in the control circuit 20 is added to the coded digital transmission signal.

In the digital modulation circuit 14, a modulation signal modulated by the π/4 shift DQPSK (π/4 Shifted, differentially encoded quadrature phase shift keying) system is generated according to the digital transmission signal and the modulation signal is converted into an analog signal by a D/A converter which is not shown in the drawing and then input to a transmission circuit (TX) 5. In the transmission circuit 5, the modulation signal is synthesized with a transmission local oscillation signal corresponding to the radio frequency of the digital speech channel and output from the frequency synthesizer 4 and converted into a radio frequency transmission signal and is then subjected to the radio frequency amplification. Then, the radio frequency transmission signal output from the transmission circuit 5 is supplied to the antenna 1 via the antenna duplexer 2 and transmitted from the antenna 1 towards the base station.

On the other hand, a portion relating to the analog mode is constructed as follows. That is, a radio frequency signal transmitted from the base station via the analog speech channel is received by the antenna 1, input to the reception circuit 3 via the duplexer 2, and then down-converted to an intermediate frequency signal in the reception circuit 3. The reception intermediate frequency signal output from the reception circuit 3 is input to an analog audio circuit (A-AUD) 15. In the analog audio circuit 15, the reception intermediate frequency signal is FM-modulated and then amplified. An analog speech signal output from the analog audio circuit 15 is input to the analog switch 10. At this time, the switching position of the analog switch 10 is controlled by the control signal output from the control circuit 20 to select and output an analog speech signal in a state in which the analog mode is set. Therefore, the analog speech signal output from the analog audio circuit 15 is supplied to the speaker 11 via the analog switch 10 and a corresponding amplified sound is output from the speaker 11.

On the other hand, a transmission signal input from the microphone 12 is input to the analog switch 13. The switching position of the analog switch 13 is controlled by the control signal output from the control circuit 20 such that a transmission signal may be input to the analog audio circuit 15 in a state in which the analog mode is set. Therefore, the transmission signal is input to the analog audio circuit 15 via the analog switch 13. In the analog audio circuit 15, a modulated signal which is FM-modulated according to the transmission signal is generated and the modulated signal is input to the transmission circuit 5. In the transmission circuit 5, the modulated signal is mixed with a transmission local oscillation signal corresponding to the radio frequency of an analog speech channel and generated from the frequency synthesizer 4 and up-converted into a radio frequency signal and subjected to the radio frequency amplification. Then, the radio frequency signal output from the transmission circuit 5 is supplied to the antenna 1 via the antenna duplexer 2 and transmitted from the antenna 1 towards the base station.

In a console unit 16, a key switch group 17 and display 18 are provided. For example, the display 18 is constructed by a liquid crystal display (LCD) and information indicating the operation state of the mobile telephone and the telephone number of a destination terminal for communication are displayed on the LCD by the control of the control circuit 20. The key switch group 17 includes digit keys used as dial keys, one-touch dial key, and function key group. In the function key group, a transmission key operated for originating call, an end key for terminating the call, an alphabet inputting key operated when an alphabet is input by use of the digit key, a function key, a volume controlling key, a recall key used when various information items stored in the memory are displayed, a store key for storing information input by means of the digit key into a management table, and a clear key used for erasing information stored in the management table are provided. Among them, for example, the function key is operated to selectively specify the analog mode or digital mode, or specify a mode for transmitting a data signal such as a facsimile image signal.

A power supply circuit 19a generates a desired operation voltage Vcc based on the output voltage of a battery 19b and supplies the operation voltage to the above circuits.

Figures 6, 7:
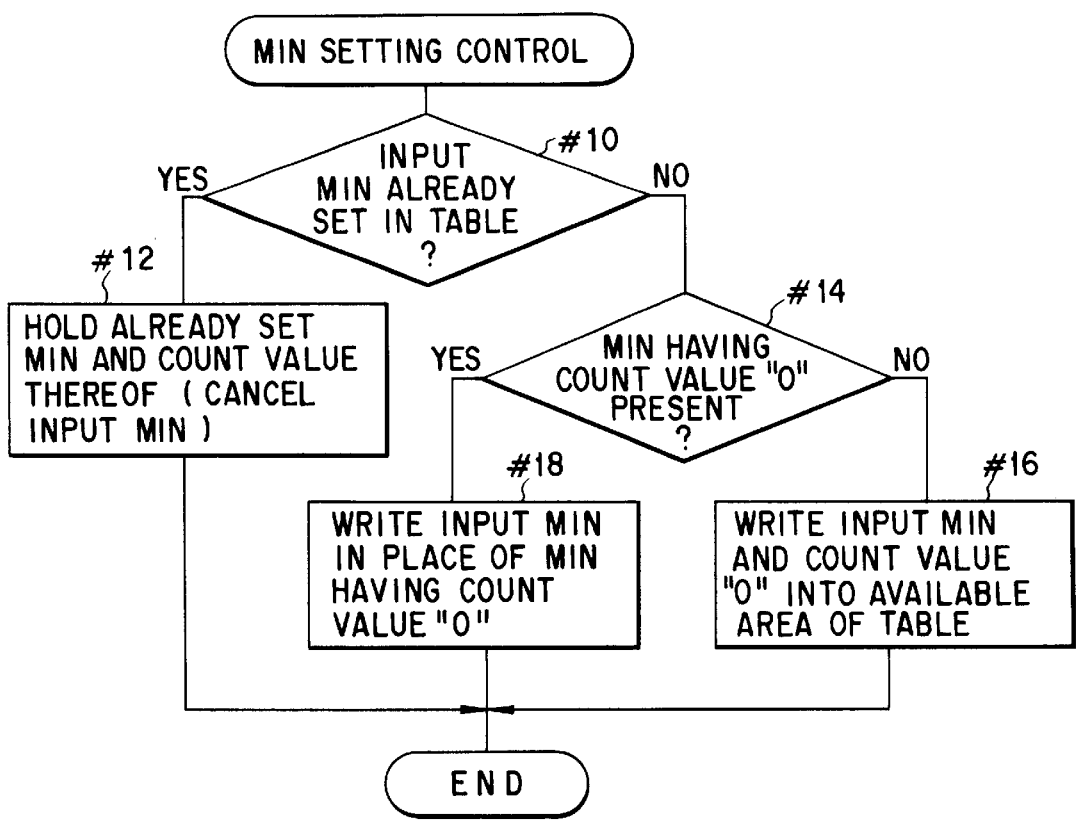
FIG. 6 is a diagram showing the construction of a management table used in the first embodiment.
FIG. 7 is a flowchart showing the MIN setting control procedure in the first embodiment.

The control circuit (CONT) 20 is connected to an authentication parameter management table 30. For example, the management table 30 is constructed by an EEPROM, flash memory, or RAM having a back-up power supply. FIG. 6 is a memory map of the authentication parameter management table 30. The management table 30 includes a first memory area 31 which can store telephone numbers MIN as identifying information items for a plurality of carriers which are under contract with the communication unit thereof, and a second memory area 32 for storing count values as authentication parameters corresponding to the telephone numbers MIN stored in the first memory area 31. The mark "*" indicates the absence of data, and FIG. 6 shows a case wherein only three MINs are set.

The control circuit 20 has a microcomputer as a main control section, for example, and includes a radio connection control section 21 having the authentication procedure in addition to the normal control such as speech control and a MIN setting control section 22.

As is described with reference to FIGS. 2 to 4 for explanation of the prior art, the radio connection control section 21 effects the process for authentication in a preset sequence prior to connection of the radio channel to the base station. The MIN setting control section 22 effects the preset setting control operation according to the MIN setting state in the management table 30 when the MIN setting operation is effected by operating the function key and digit key. The MIN setting operation is effected at an adequate timing by the user when the carrier is changed.

Figure 1:
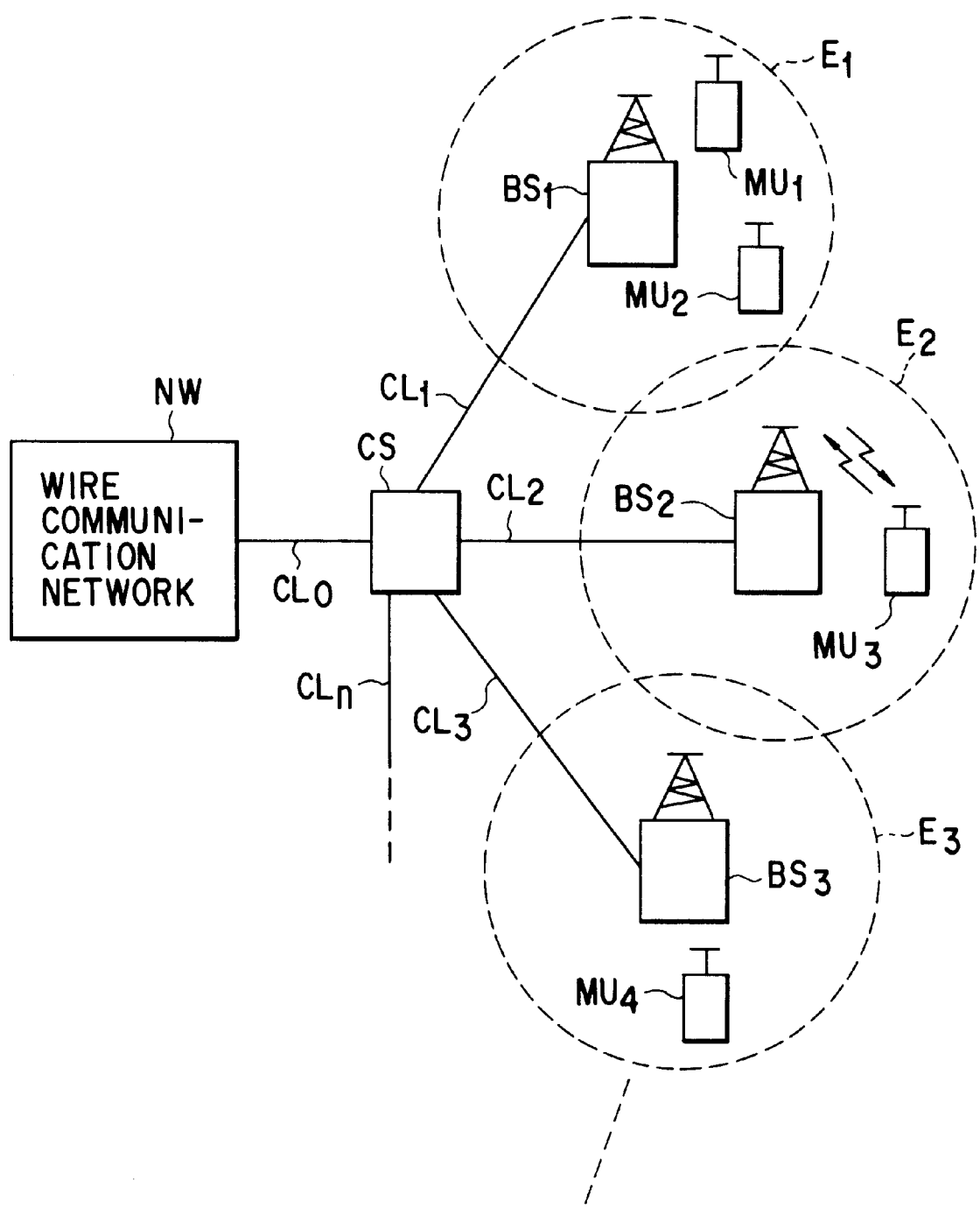
FIG. 1 is a schematic construction diagram showing one example of a cellular radio communication system.

The authentication management center (which is located in a control station of higher rank than the control station CS in FIG. 1 or control station CS provided for a plurality of carriers) which is not shown in the drawing has management tables similar to that shown in FIG. 6 for all of the radio communication devices. The count value is incremented by a control signal from the base station each time the communication is effected.

FIG. 7 is a flowchart showing the MIN setting control process. In this case, suppose that three MINs and count values for them are stored in the management table 30 as shown in FIG. 6. A case wherein the user sets a carrier (MIN) in this state is explained. The setting operation includes a newly setting operation and resetting operation. The newly setting operation is effected when a MIN which is not present in the management table 30 is input and the resetting (changing) operation is effected when a MIN which is already present in the management table 30 is input.

When the MIN setting operation is effected, the control circuit 20 first determines in the step #10 whether or not the input MIN is already set in the management table 30 as shown in FIG. 7. When the MIN "123-456-7890" is input, the control circuit determines that the MIN setting operation is the resetting operation since the input MIN is already set, and it holds the MIN and count value for that MIN which are already set as they are (step #12). That is, in the case of FIG. 6, the MIN "123-456-7890" and the count value "9" for the MIN are held as they are. Therefore, even if a request of call originating operation or call incoming operation using the MIN "123-456-7890" is issued in this state, the count value "9" which was previously used is successively used, and as a result, the result of collation of the count values in the authentication management center always indicates "coincidence". Therefore, even when the MIN is reset, the radio communication is successively effected by using the MIN.

On the other hand, when it is determined in the step #10 that the input MIN is not set in the management table 30, the control circuit 20 determines in the step #14 whether or not a MIN having a count value "0" is set in the management table 30. If such a MIN is not set, the input MIN is newly set in an available area of the table 30 and a count "0" is stored for the MIN (step #16). Further, as shown in FIG. 6, for example, when the MIN "543-219-4321" having a count value of "0" is set, the newly input MIN is stored (step #18) instead of the set MIN "543-219-4321" having the count value of "0". Of course, the count value therefor is "0".

Thus, according to the above embodiment, the management table 30 for storing count values as authentication parameters corresponding to MINs used as identification information items is provided. When a MIN is set, whether or not a MIN input by the setting operation is already set in the management table 30 is first determined, and if it is set, it is determined that the MIN setting operation is the resetting operation and the MIN and count value which are already set are kept unchanged. If it is determined that the input MIN is not set in the management table 30, whether or not a MIN having a count value of "0" is set in the management table 30 is determined, and if it is set, the newly input MIN is set in place of the set MIN, and only when the MIN is not set, the MIN and count value are newly set. Therefore, it becomes possible to cancel the MIN which has been set but has not been used and efficiently use the memory capacity of the management table 30.

Thus, according to the above embodiment, even when the MIN is temporarily changed to another MIN and then reset to the original MIN, the count value is kept at a value set before the change and corresponding to the original MIN. Therefore, the authentication procedure can be correctly effected even after resetting of the MIN and the radio communication can be effected by successively using the original MIN.

Further, at the time of MIN setting, whether a MIN having a count value kept at "0" is present or not is determined, and if such a MIN is present, a new MIN is set in place of the MIN. Therefore, a large number of MINs can be prevented from being unnecessarily set, and as a result, the limited memory area of the management table 30 can be effectively used.

Further, by using a randomly readable and programmable non-volatile memory such as a RAM having a back-up power supply, EEPROM, or flash memory as the management table 30, for example, the set MIN and the count value therefor can be kept held even when the power supply of the mobile radio communication device is cut off by replacement of the batteries, for example.

The present invention is not limited to the above embodiment and can be variously modified without departing from the technical scope thereof in relation to the type of memory used as the management table and the memory map thereof, the control procedure and control content of the MIN setting control section, the type of the authentication parameter and the procedure of authentication, the radio connection control procedure and the like.

As described above, according to the present invention, randomly readable and programmable storage means for storing identification information items and authentication parameters corresponding to the identification information items in a corresponding relation is provided, and determining means and setting control means are provided. When identification information setting operation is effected, whether or not identification information input by the setting operation is already stored in the storage means is determined by the determining means. When it is determined that the identification information is already stored, the setting control means holds the already stored identification information and authentication parameter as they are, and when it is determined that the identification information is not stored, the setting control means newly stores the input identification information together with the initial value of the authentication parameter into the storage means.

Therefore, according to the present invention, it is possible to provide a mobile radio communication device capable of successively effecting the radio connection containing the authentication procedure with respect to the base station by use of identification information even when the identification information is temporarily changed and then restored to the original identification information.

We claim:

1. A mobile radio communication device connectable to a base station and effecting an authentication procedure by use of identification information and an authentication parameter corresponding to the identification information, comprising:

storage means for storing a plurality of identification information items and authentication parameters corresponding to the identification information items;

input means for inputting identification information;

means for determining whether the input identification information is already stored in said storage means; and control means for writing the input identification information together with an initial value of the authentication parameter into said storage means when said determining means determines that the input identification information is not stored.

2. A mobile radio communication device according to claim 1, wherein said control means determines whether or not particular identification information having an unchanged authentication parameter which is at an initial value is stored in said storage means when it is determined that the input identification information is not stored, said control means storing the input identification information instead of the particular stored identification information when it is determined that the particular identification information is stored, and storing the input identification information together with the initial value of the authentication parameter into an available area of said storage means when it is determined that the particular identification information is not stored.

3. A mobile radio communication device according to claim 2, wherein the authentication parameter is the number of communications and the initial value thereof is zero.

4. A mobile radio communication device according to claim 1, wherein said storage means is a non-volatile semiconductor memory.

5. A mobile radio communication device according to claim 1, wherein said mobile radio communication device is any one of a car telephone device, a portable telephone and a cordless telephone, and the identification information is a telephone number.

6. A mobile radio communication device according to claim 5, wherein the identification information is telephone numbers assigned to each telephone company with which said mobile radio communication device makes a contract.

7. A mobile radio communication system having a base station and a mobile radio station, wherein said mobile radio station comprises:

storage means for storing a plurality of identification information items and authentication parameters corresponding to the identification information items;

input means for inputting identification information;

means for determining whether the identification information input by said input means is already stored in said storage means;

control means for holding the already stored identification information and corresponding authentication parameter as they are when said determining means determines that the input identification information is already stored and storing the input identification information together with an initial value of the authentication parameter into said storage means when said determining means determines that the input identification information is not stored; and means for sending an originating call signal containing identification information and authentication parameter to said base station before transmission and sending an incoming call signal containing identification information and authentication parameter to said base station before reception, and wherein said base station comprises:

means for storing identification information and authentication parameter for said mobile radio station; and means for simultaneously updating corresponding authentication parameters of said mobile radio station and said base station, and said mobile radio communication system comprises:

authentication management means comprising means for detecting the identification information and authentication parameter contained in the originating call signal and incoming call signal transmitted from said mobile radio station, determining whether the detected authentication parameter coincides with an authentication parameter corresponding to the identification information of the corresponding mobile radio station stored in said base station, and permitting creation of a radio link between said base station and said mobile radio station only in a case of coincidence.

8. A mobile radio communication system according to claim 7, wherein said control means determines whether or not particular identification information having an unchanged authentication parameter which is at an initial value is stored in said storage means when it is determined that the input identification information is not stored, said control means storing the input identification information instead of the particular stored identification information when it is determined that the particular identification information is stored, and storing the input identification information together with the initial value of the authentication parameter into an available area of said storage means when it is determined that the particular identification information is not stored.

9. A mobile radio communication system according to claim 8, wherein the authentication parameter is the number of communications and the initial value thereof is zero.

10. A mobile radio communication system according to claim 7, wherein said storage means is a non-volatile semiconductor memory.

11. A mobile radio communication system according to claim 7, wherein said mobile radio communication device is any one of a car telephone device, a portable telephone and a cordless telephone, and the identification information is a telephone number.

12. A mobile radio communication system according to claim 11, wherein the identification information is telephone numbers assigned to each telephone company with which said mobile radio communication device makes a contract.

13. A mobile radio communication device, comprising:

a memory for storing at least two identification information items and changeable authentication parameters respectively corresponding to each of the identification information items;

an input device for inputting data designating an identification information item; and a control circuit for controlling a procedure for establishing a radio communication with a base station, wherein if the designated identification information item corresponds to one of the stored identification information items, said control circuit uses the corresponding stored identification information item and its corresponding authentication parameter in a procedure for establishing radio communication with said base station and, if radio communication then is established with said base station, said control circuit changes the authentication parameter corresponding to the stored identification information item used in the procedure for establishing radio communication, but changes no other authentication parameters.

14. The mobile radio communication device according to claim 13, wherein
if the designated identification information item does not correspond to one of the stored identification items, said control circuit stores in said memory the designated identification information item together with a corresponding authentication parameter having an initial value.

15. The mobile radio communication device according to claim 14, wherein each authentication parameter comprises the number of radio communications established using the corresponding identification information item, and the initial value of each authentication parameter is zero.

16. The mobile radio communication device according to claim 13, wherein the identification information items are telephone numbers and each authentication parameter comprises the number of radio communications established using the corresponding telephone number.

17. The mobile radio communication device according to claim 13, wherein
if the designated identification information item does not correspond to one of the stored identification information items and if the authentication parameter corresponding to some one of the stored identification information items is equal to an initial value, said control circuit replaces the some one of the stored identification information items with the designated identification information item.

18. The mobile radio communication device according to claim 13, wherein
if the designated identification information item does not correspond to one of the stored identification information items and if none of the authentication parameters corresponding to the stored identification information items is equal to an initial value, said control circuit stores the designated identification information item in an available area of said memory.

19. The mobile radio communication device according to claim 13, wherein each authentication parameter is a count value which is incremented each time radio communication is established with a base station.

20. The mobile radio communication device according to claim 13, wherein said mobile radio communication device is operable in either one of a digital mode or an analog mode.

21. A mobile radio communication device according to claim 1, wherein said control means holds the already stored identification information and corresponding authentication parameter when said determining means detrmines that the input identification information is already stored.

* * * * *

UNITED STATES PATENT AND TRADEMARK OFFICE
CERTIFICATE OF CORRECTION

PATENT NO.: 5,943,614

DATED: August 24, 1999

INVENTOR(S): Arata OBAYASHI, et al.

It is certified that an error appears in the above-identified patent and that said Letters Patent is hereby corrected as shown below:

On the title page,

In item [54] title:

Change title from "Mobile Radio Communication Device Using Plurals Authentication Parameters" to --Mobile Radio Communication System Using Authentication Information and Mobile Radio Communication Device Used In the System--.

In claim 21, line 24:

Delete the word "detrmines" and insert --determines--.

Signed and Sealed this

Ninth Day of May, 2000

Attest:

Q. TODD DICKINSON

Attesting Officer

Director of Patents and Trademarks